United States Patent [19]

Newman et al.

[11] 3,957,957

[45] May 18, 1976

[54] METHOD FOR PREPARING GRAPHITE ARTICLES

[75] Inventors: John W. Newman, Ashland; Charles D. Hoertz, Jr., Bellefonte, both of Ky.

[73] Assignee: Ashland Oil, Inc., Ashland, Ky.

[22] Filed: May 30, 1974

[21] Appl. No.: 474,637

[52] U.S. Cl.................................. 423/448; 264/29
[51] Int. Cl.².......................................... C01B 31/04
[58] Field of Search................... 423/448, 445, 449; 264/29

[56] References Cited
UNITED STATES PATENTS

| | | | |
|---|---|---|---|
| 3,001,237 | 9/1961 | Balaguer | 264/29 X |
| 3,126,430 | 3/1964 | Price | 264/29 |
| 3,309,437 | 3/1967 | Harnett | 264/29 |
| 3,460,907 | 8/1969 | Winsett | 423/448 |

FOREIGN PATENTS OR APPLICATIONS

| | | | |
|---|---|---|---|
| 870,730 | 6/1961 | United Kingdom | 264/29 |

*Primary Examiner*—Edward J. Meros
*Attorney, Agent, or Firm*—Van D. Harrison, Jr.

[57] ABSTRACT

Graphite products particularly suited for use in nuclear reactors are prepared by combining thermal petroleum pitch and particulated coke made from the same pitch into a moldable composition. The composition is molded into a desired shape. The shape is baked, impregnated with additional pitch, baked further, and then heated to temperatures sufficient to graphitize it. For nuclear applications a petroleum pitch low in sulfur content is preferred.

8 Claims, No Drawings

METHOD FOR PREPARING GRAPHITE ARTICLES

NATURE OF INVENTION

This invention relates to a new and improved method for making dense graphite bodies. More particularly, this invention is directed to the production of nuclear core elements by forming very dense bodies of graphite which are relatively non-porous and mechanically strong.

PRIOR ART

Graphite products are conventionally formed by extruding or molding into the desired shape a graphitizable mixture of graphite or carbon particles and a binder of pitch. The molded shapes are then baked, cooled, and impregnated with additional pitch and again baked. This reimpregnation may be repeated several times in order to attain a desired final density. The impregnated article lastly is heated to a temperature sufficient to cause graphitization.

With respect to the production of nuclear fuel element components, it is particularly important to have available refractory bodies made of a graphite whose properties are consistent from one body to the next. This is particularly true in those applications wherein a graphite having a low concentration of impurities, particularly sulfur, is required.

Sulfur is thought to create several problems. If it is present it is necessary to conduct graphitization at temperatures as high as 3000°C to drive off the sulfur from the article being graphitized. If no sulfur is present, temperatures as low as 2600°C to 2200°C can be used. Sulfur is thought to catalyze the process of graphitization. Consequently, as the sulfur migrates through the article at elevated temperatures, it causes variations in the graphitization along its path. This, in turn, creates localized areas of stress in the graphitized article.

Petroleum coke has long been an available product of the petroleum industry and is manufactured by processes well known.

The feedstock for producing petroleum pitch ordinarily is a refinery hydrocarbon stream containing a high concentration of aromatics. The feedstock thus can be decant oil or a solvent extract of the decant oil. Various methods of processing these pitch feedstocks to pitch are used. Each process begins by fractionating the pitch feedstock to remove low boiling oils. In the thermal pitch process the high boiling point fraction is then further subjected to heating so that the aromatic compounds present are further condensed and polymerized to polynuclear aromatics. The product resulting is a high quality pitch usually having a softening point of 130°–290°F (54.5°–143°C). In an alternative process, the air-oxidation method, air is blown through the heated high boiling point fraction to produce a pitch.

Air blown hydrocarbons are not normally employed in the manufacture of synthetic graphite bodies as air blowing imparts undesirable softening point-coking value and softening point-viscosity relationships that make the fabrication of the graphitized pitch more difficult and expensive.

OBJECTS OF THE INVENTION

A primary object of this invention is to provide a method of making high density graphite bodies of consistent quality from a manufactured carbon precursor (the pitch) of consistent quality.

Still another object of this invention is to provide a method of making graphite bodies wherein the temperature of graphitization can be varied within desired limits and maintained at temperatures lower than that necessary to drive off sulfur contaminants.

SUMMARY OF THE INVENTION

Briefly stated, our invention is a method for making a graphite article comprising:

a. Converting a first portion of a petroleum pitch to a particulated petroleum coke;

b. Mixing a second portion of the petroleum pitch of (a) with the petroleum coke of (a) to form a moldable paste;

c. Molding the resulting paste of (b) into an article of a desired shape;

d. Baking the article of (c) until the volatile components of said pitch have been vaporized;

e. Impregnating said baked article of (d) with a third portion of the petroleum pitch of (a); and f. Heating the resulting impregnated baked article of (e) to a temperature sufficient to convert the carbon present to graphite.

DESCRIPTION OF THE INVENTION

The basis of our invention is the concept of using a thermal petroleum pitch and only petroleum coke derived from that same petroleum pitch as the components for making graphite articles.

The petroleum pitch used in our invention is the thermal petroleum pitch now available as a petroleum refinery product. The pitch ordinarily will have a softening point of between 130° and 290°F. The oxidized petroleum pitch also available is not a part of this invention. The following table shows some properties of some typical thermal petroleum pitches which can be used in our invention.

| | | | |
|---|---|---|---|
| Softening Point, R&B, °F. | 170 | 300 | 240 |
| Viscosity, Brookfield, | | | |
| cps at Temp., °F, 375 | 30 | 390 | 140 |
| 350 | 45 | 780 | 275 |
| 325 | 86 | 1600 | 700 |
| Coking Value (ASTM D-2416) | 38 | 63 | 51 |
| Wt. % Benzene Insolubles | 4 | 28 | 5.0 |
| Wt. % Quinoline Insolubles | Nil | 0.5 | Nil |
| Sp. Gr., 77°F/77°F | 1.19 | 1.24 | 1.22 |
| Sulfur, Wt. % | 1.3 | 1.3 | 1.3 |
| Avg. Mol. Wt. | 380 | 530 | 487 |
| Carbon, Wt. % | 92.4 | 94.0 | 93.1 |
| Hydrogen, Wt. % | 5.7 | 4.4 | 5.4 |

The petroleum coke used in our invention is made from the same pitch as that used as the binder pitch. Typical properties of petroleum needle coke made from samples of the 170 and 240 S.P. pitches above are as follows:

| | | |
|---|---|---|
| Pitch Softening Pt., °F (R&B) | 170 | 240 |
| Carbon Yield Wt. %[1] | 49 | 60 |
| X-ray Diffraction: | | |
| Interlayer Spacing | 3.360 | 3.358 |
| Lc | 520 | 860 |
| La | 510 | 1000 |
| Coke Microstructure, %: | | |
| Needle Structured Acicular | 77 | 83 |
| Fine Structured Isotropic | 23 | 17 |

[1] Carbonized in a closed graphite boat to 2800°C in argon.

The techniques of manufacturing needle coke from petroleum pitch forms no part of our invention and are widely known to those working in the art.

In the manufacture of the graphite article, predetermined weights of thermal petroleum pitch and powdered or particulated coke made from the same pitch are placed in a suitable mix. Mixing is done at a temperature of 70°C to 200°C depending on the melting point of the pitch binder and for a time of 20 to 120 minutes. The mixture is then compressed or extruded into the desired shape and baked to a temperature of about 600°C to 1000°C for a period of 5 to 60 days to carbonize the binder. The resulting article is then impregnated with an additional quantity of the same pitch, as originally used, under conditions of temperature and pressure sufficient to effect permeation of the liquid pitch into the pore spaces of the article. The article is then again baked at a temperature of 600°C to 1000°C for a period sufficient to carbonize the added pitch. This step of impregnation and heating is repeated as many times as deemed necessary. The article is finally heated to a temperature of 2200°C or higher, for example, between 2800°C and 3000°C, or preferably 2200°C to 2600°C to graphitize the baked article.

If a thermal petroleum pitch of low impurity content, particularly of low sulfur content, is used as a binder, the article produced from graphitizing coke made from this same pitch will of necessity have a low sulfur content. Articles thus made have particular utility in thermonuclear applications.

Thermal petroleum pitches to be used in our method can have a softening point of between about 130°F to about 290°F, although we prefer pitches having a softening point of between about 170°F and about 240°F.

Densification of the article which is the purpose of the multiple pitch impregnation and baking step can also be accomplished by isostatic pressurization of the green article after it has been molded and before subsequent baking and graphitization.

We claim:

1. A method for making a graphite article comprising:
   a. converting a first portion of a thermal unoxidized petroleum pitch to a particulated petroleum coke;
   b. mixing with the particulated petroleum coke of (a) a second portion of the thermal unoxidized petroleum pitch of (a) to form a moldable paste;
   c. molding the resulting paste of (b) into an article of a desired shape;
   d. baking the article of (c) until the volatile components of said pitch have been vaporized;
   e. impregnating said baked article of (d) with a third portion of the thermal unoxidized petroleum pitch of (a); and
   f. heating the resulting impregnated baked article of (e) to a temperature of at least 2200°C thereby converting said article to graphite.

2. The method of claim 1 wherein the petroleum pitch is a thermal petroleum pitch having a softening point of between about 130°F to 290°F.

3. The method of claim 1 wherein the petroleum pitch is a thermal petroleum pitch having a softening point of between about 170°F to about 240°F.

4. The method of claim 1 wherein said impregnated baked article is heated to a temperature between about 2800°C and about 3000°C.

5. The method of claim 1 wherein said impregnated baked article is heated to a temperature between about 2200°C to about 2600°C.

6. The method of claim 1 wherein after step (e) and prior to step (f) the impregnated article is baked and again impregnated with a fourth portion of the petroleum pitch of (a).

7. The method of claim 6 wherein the impregnation and baking are repeated until a desired density is attained.

8. The method of claim 1 wherein the petroleum pitch is a thermal petroleum pitch having a sulfur content of less than about 2.5% by weight of sulfur.

* * * * *